United States Patent
Abernathy et al.

(10) Patent No.: US 9,542,194 B2
(45) Date of Patent: Jan. 10, 2017

(54) SPECULATIVE REGISTER FILE READ SUPPRESSION

(71) Applicant: ARM LIMITED, Cambridge (GB)

(72) Inventors: Chris Abernathy, Austin, TX (US); Florent Begon, Sophia Antipolis (FR); Michael Alan Filippo, Austin, TX (US)

(73) Assignee: ARM Limited, Cambridge (GB)

( * ) Notice: Subject to any disclaimer, the term of this patent is extended or adjusted under 35 U.S.C. 154(b) by 301 days.

(21) Appl. No.: 14/482,146

(22) Filed: Sep. 10, 2014

(65) Prior Publication Data
US 2016/0070576 A1    Mar. 10, 2016

(51) Int. Cl.
*G06F 9/38*    (2006.01)

(52) U.S. Cl.
CPC .............. *G06F 9/3857* (2013.01); *G06F 9/384* (2013.01)

(58) Field of Classification Search
None
See application file for complete search history.

(56) References Cited

U.S. PATENT DOCUMENTS

| 2009/0292892 A1 | 11/2009 | Abernathy et al. |
| 2014/0122844 A1 | 5/2014 | Swanberg |

FOREIGN PATENT DOCUMENTS

WO    WO 2006/094197    9/2006

OTHER PUBLICATIONS

UK Search Report issued Oct. 23, 2015 in GB 1512599.0, 4 pages.

*Primary Examiner* — William B Partridge
(74) *Attorney, Agent, or Firm* — Nixon & Vanderhye P.C.

(57) ABSTRACT

A single threaded out-of-order processor 2 includes an architected register file 22 and a speculative register file 20. Speculative register allocation circuitry 24 serves to allocate speculative registers for use in accordance with an allocation sequence and taken from a position determined by a tail point. Read suppression circuitry 30 serves to maintain a boundary pointer corresponding to a position within the allocation sequence such that no speculative register more recently allocated within the allocation sequence than that corresponding to the boundary pointer can have a valid register value. The read suppression circuitry 30 serves to suppress read operations for source operands lying within a read-suppression region delimited by the tail point and the boundary pointer. Separate boundary pointers may be maintained for different types of register values, such as integer register values and floating point register values.

14 Claims, 5 Drawing Sheets

SPECULATIVE REGISTER FILE READ SUPPRESSION

BACKGROUND

Field

Figure 1:
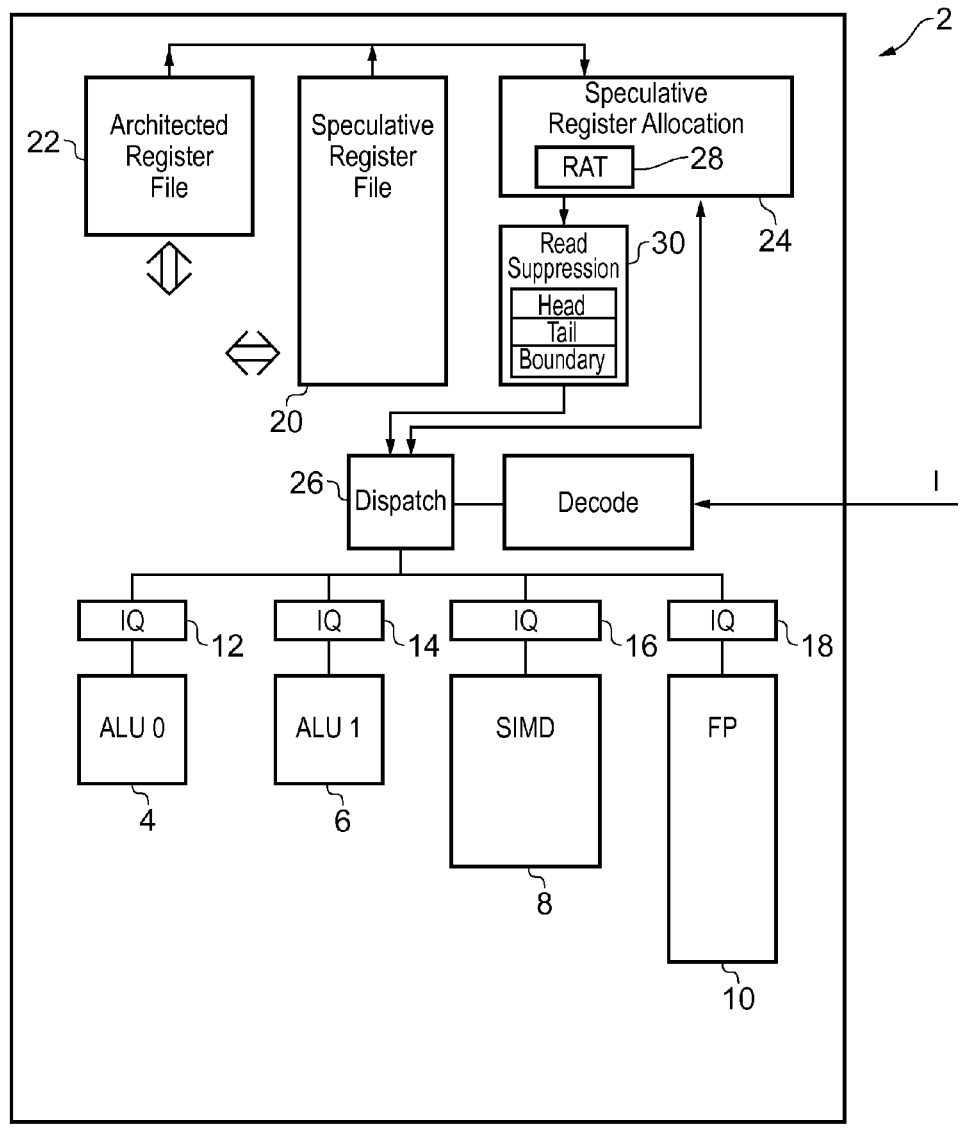

This disclosure relates the field of data processing systems. More particularly, this disclosure relates the suppression of read operations to a speculative register file.

Prior Art

It is known to provide data processing systems including an architected register file for storing committed register values within architected registers and a speculative register file for storing uncommitted register values within speculative registers. When a destination register requires allocation for an instruction, an available speculative register within the speculative register file is allocated to serve as the destination register for the instruction. The result operand value is subsequently returned to that allocated speculative register. When the commit point within the instruction stream reaches the instruction concerned, the value stored within the speculative register is transferred to the corresponding architected register as a committed register value and the speculative register de-allocated, such that it is available for the re-use.

When an instruction requires a source operand, a determination is made as to whether or not the source operand concerned is to be read from the speculative register file or the architected register file. The techniques for making such a determination will be familiar to those in the technical field of out-of-order processing within data processing systems. If the source operand value is not yet available, as it has not yet been at least written into the corresponding speculative register from which it is to be read, then the speculative register value will be identified as invalid and the instruction will not yet be dispatched.

SUMMARY

Viewed from one aspect the present disclosure provides apparatus comprising:
an architected register file to store committed registers values within architected registers;
a speculative register file to store uncommitted register value within speculative registers; speculative register allocation circuitry to allocate in order within an allocation sequence from a tail point within said allocation sequence a speculative register to serve as an operand destinations; and
read suppression circuitry:
  (i) to maintain a boundary pointer for a type of register value to a boundary speculative register within said allocation sequence having a location within said allocation sequence such that no speculative register more recently allocated within said allocation sequence than said boundary speculative register can contain a valid register value of said type of register value; and
  (ii) to suppress a read to provide a source operand value of a speculative register within a read-suppression region of said allocation sequence delimited by said tail point and said boundary pointer.

The present disclosure recognises that the characteristic that the speculative registers are allocated and de-allocated in a given allocation sequence allows a low cost determination to be made as to whether a read of a source operand within the speculative register file may be suppressed, thereby saving power. The register files are typically large multi-port structures and consume a disadvantageous amount of energy when performing a read operation which is not necessary. The read operation can be recognised as suitable for suppression by maintaining a boundary pointer indicating a position within the allocation sequence such that no speculative register more recently allocated within the allocation sequence than a boundary speculation register indicated by the boundary pointer can contain a valid register value. Thus, the read of the speculative register file can be avoided by a comparison of the position of the speculative register to potentially be read with the boundary pointer to determine whether the speculative register to be read lies within a read-suppression region which is known not to contain any valid register values.

Viewed from another aspect the present disclosure provides apparatus comprising:
architected register file means for storing committed register values within architected registers;
speculative register file means for storing uncommitted register values within speculative registers;
speculative register allocation means for allocating in order within an allocation sequence from a tail point within said allocation sequence a speculative register to serve as an operand destinations; and
read suppression means:
  (i) for maintaining a boundary pointer for a type of register value to a boundary speculative register within said allocation sequence having a location within said allocation sequence such that no speculative register more recently allocated within said allocation sequence than said boundary speculative register can contain a valid register value of said type of register value; and
  (ii) for suppressing a read to provide a source operand value of a speculative register within a read-suppression region of said allocation sequence delimited by said tail point and said boundary pointer.

Viewed from another aspect the present disclosure provides a method comprising the steps of:
storing committed register values within architected registers;
storing uncommitted register values within speculative registers;
allocating in order within an allocation sequence from a tail point within said allocation sequence a speculative register to serve as an operand destinations;
maintaining a boundary pointer for a type of register value to a boundary speculative register within said allocation sequence having a location within said allocation sequence such that no speculative register more recently allocated within said allocation sequence than said boundary speculative register can contain a valid register value of said type of register value; and
suppressing a read to provide a source operand value of a speculative register within a read-suppression region of said allocation sequence delimited by said tail point and said boundary pointer.

DRAWINGS

Figure 2:
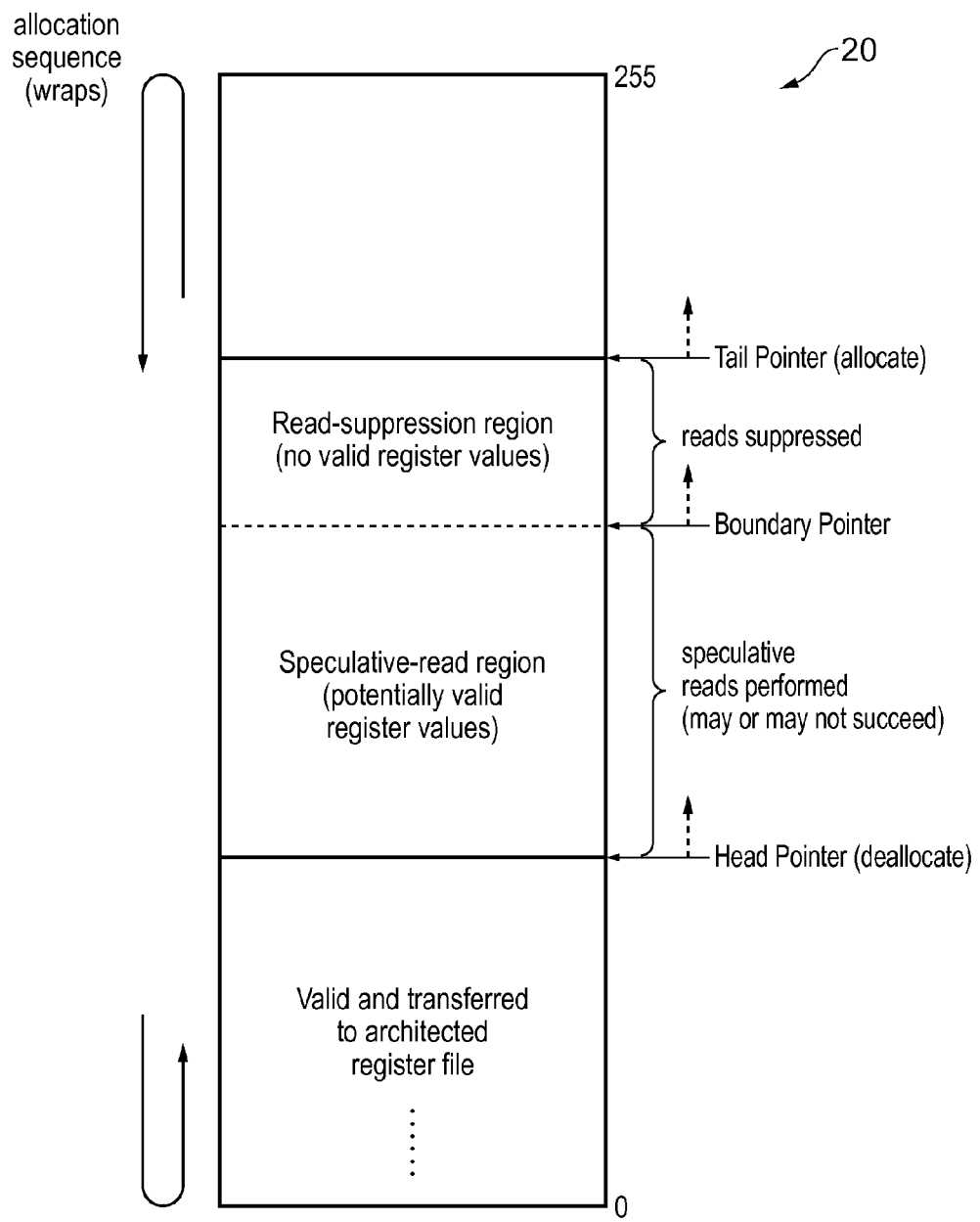
Figure 3:
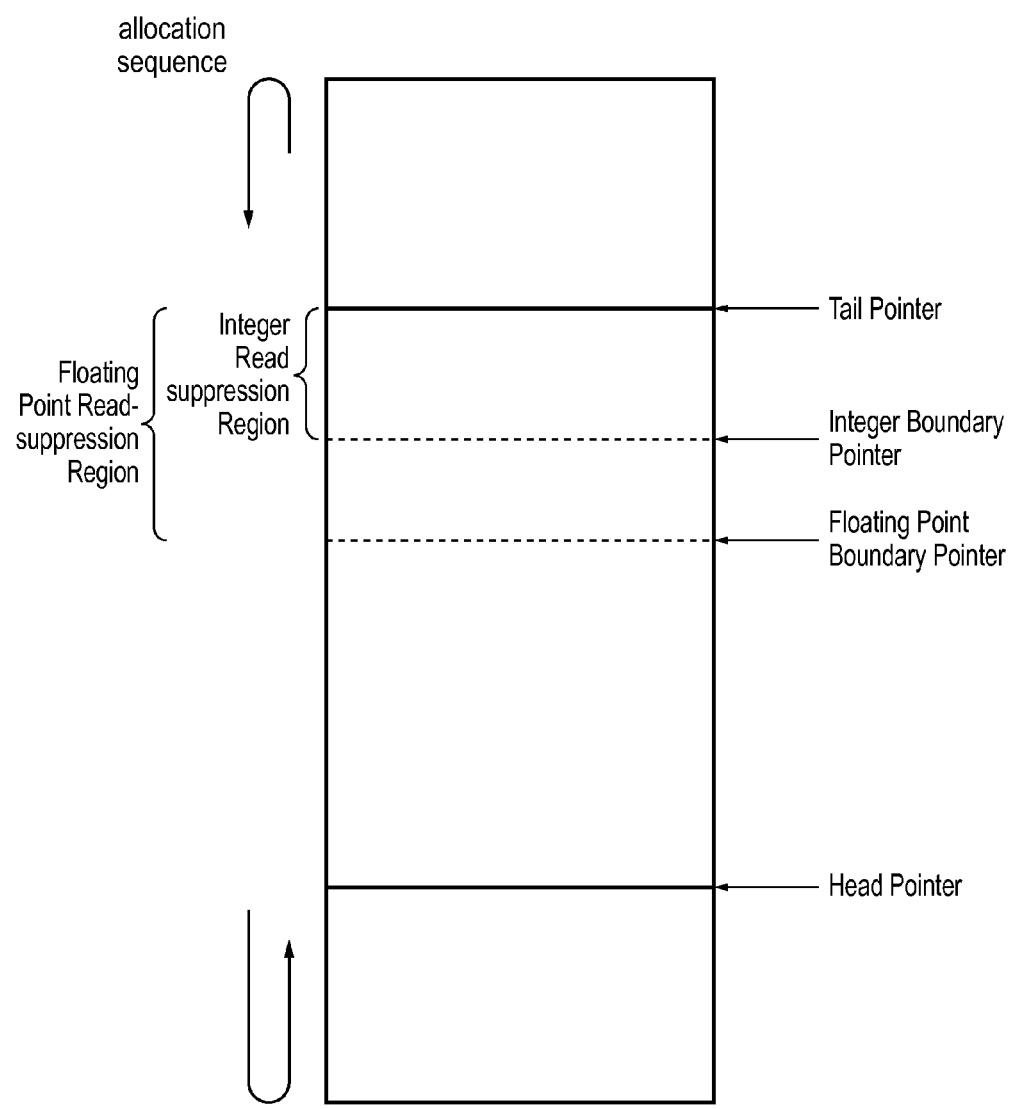
Figure 4:
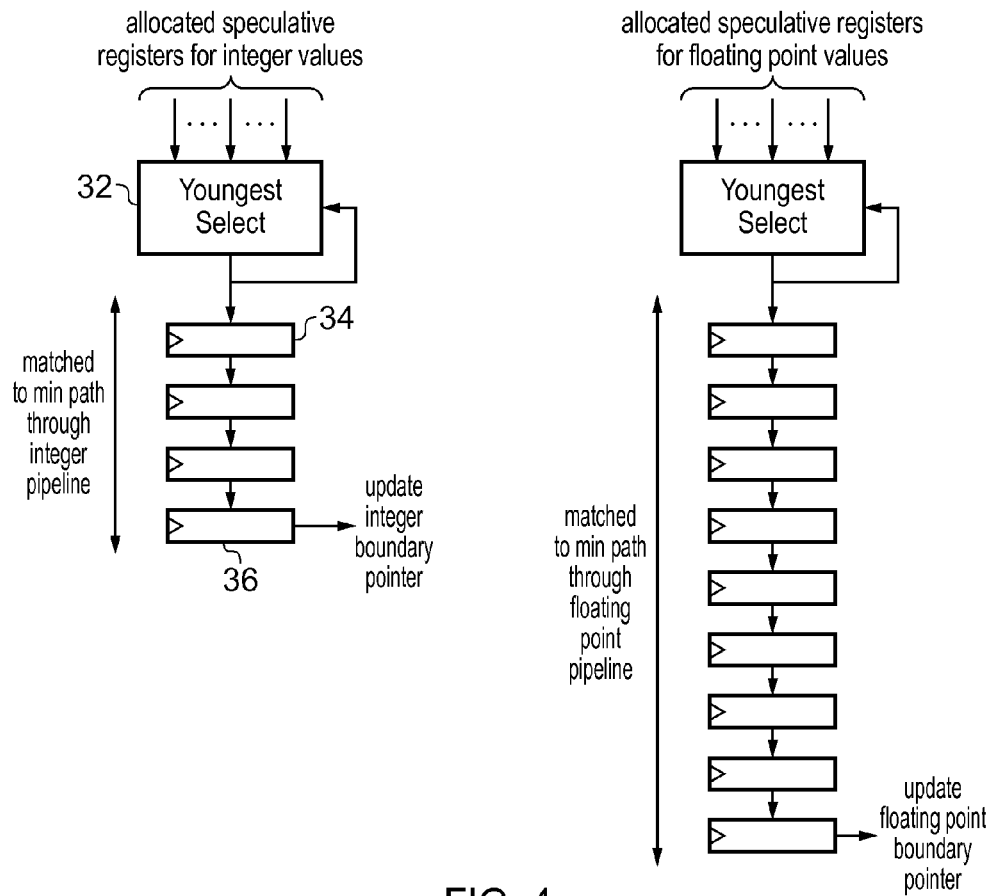
Figure 5:
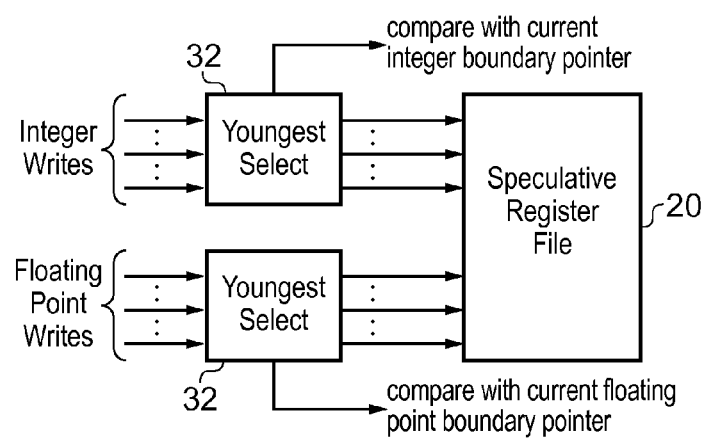
Figure 6:
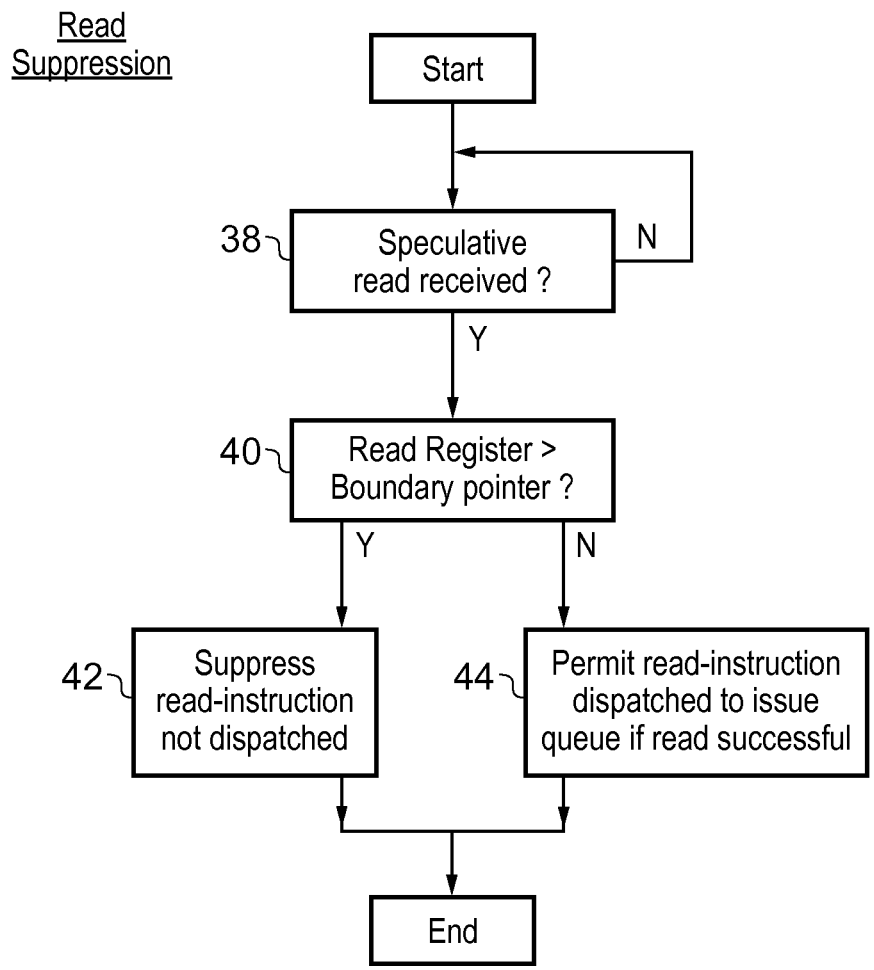

Embodiments of the disclosure will now be described by way of example only, with reference to the accompanying drawings in which:

FIG. 1 schematically illustrates a single-threaded out-of-order processor including a speculative register file and an architected register file;

FIG. 2 schematically illustrates maintaining a boundary pointer for a single type of register value so as to identify a read-suppression region within a speculative register file;

FIG. 3 schematically illustrates maintaining separate boundary pointers for respective different types of register values;

FIG. 4 schematically illustrates mechanisms for updating boundary pointer values depending upon the minimum processing cycle delay associated with different processing pipelines;

FIG. 5 schematically illustrates a mechanism for updating boundary pointer values in dependence upon observed writes to a speculative register file; and FIG. 6 is a flow diagram schematically illustrates read suppression.

EMBODIMENTS

It will be appreciated that the boundary pointer and the tail point used to delimit the read-suppression region may have a variety of different forms. The boundary point and the tail point could identify different particular registers in order to achieve this delimitation. More generally, the read-suppression region has boundaries with some fixed relationship to the tail point and the boundary pointer. The present techniques encompass such variations.

The speculative register allocation circuitry may in some embodiments also serve to deallocate in order with the allocation sequence from a head point within the allocation sequence a speculative register storing a committed register value transferred to the architected register file. Accordingly, speculative registers may be freed for re-use as the register values they contain are transferred to the architected register file with the de-allocation taking place in an order in accordance with the allocation sequence as the corresponding instructions are committed/retired.

It will be appreciated that the allocation sequence could have a variety of different forms. One particular form is when the speculative registers have sequential speculative register numbers and the allocation sequence follows the speculative register numbers and wraps at a limit of the sequential speculative register numbers. Such an arrangement allows efficient tracking of the allocation sequence and the various pointers may be maintained by simple increments.

The read suppression circuitry may maintain the boundary pointer delimiting the read-suppression region in variety of different ways. One particular way is when the read suppression circuitry serves to determine a position of the boundary pointer within the allocation sequence to correspond to a speculative register allocated at an earliest time any issued instruction can return a value. Such an approach uses a worse-case assumption for the size of the read-suppression region based upon the earliest time it is possible that an issued instruction can have returned a value.

In some embodiments the earliest time may be based upon the quickest instruction processing pipeline present within the apparatus. In other embodiments the read suppression circuitry may be configured to determine an earliest time for each of a plurality of different types of register value in dependence upon a processing time of an instruction processing pipeline for each type of register value as an instruction is issued to the register processing pipeline concerned. Thus, it can be known, for example, that the earliest time an integer value may be returned by an issued instruction corresponds to the minimum cycle depth of the integer pipeline whereas the minimum time by which a floating point value may be returned will be determined by the minimum, typically longer, cycle depth floating point pipeline. The present techniques permit multiple boundary values to be tracked with each corresponding to a different type of register value working upon the insight that a speculative register to be written with a different type of register value will subsequently be read with an instruction corresponding to that type of register value. Thus different read-suppression regions may be maintained for different instruction types. For example, different read-suppression regions may be maintained for integer values and floating point values that are stored within the same speculative register file.

Another mechanism by which the read suppression circuitry may maintain the boundary pointer is by monitoring writes to the speculative register file and updating the boundary pointer to a position corresponding to a monitored write if that monitored write is to a younger speculative register than that currently associated with the boundary pointer.

It is known that processing may be subject to flush operations, e.g. those arising due to branch mispredictions or exceptions. In some embodiments the read suppression circuitry may be adapted to respond to a flush operation that changes the tail point so as to update the boundary pointer to correspond the updated tail point. In this way, if the tail point is pushed back, then the boundary pointer is also pushed back such that a read-suppression region may be re-established more quickly.

FIG. 1 schematically illustrates a single threaded out-of-order processor 2. This processor 2 includes two integer pipelines 4, 6, a single instruction multiple data pipeline 8 and a floating point pipeline 10. These different pipelines have different cycle depths. Each of the pipelines 4, 6, 8, 10 has an associated instruction queue 12, 14, 16, 18 holding instructions for which corresponding speculative registers holding any necessary source operands have already been identified and which are awaiting issue into the corresponding 4, 6, 8, 10.

Register values are held within a speculative register file 20 and an architected register file 22. Speculative register allocation circuitry 24 serves to allocate a speculative register within the speculative register file 20 to serve as a destination register for a destination operand to be written by an instruction that is to be dispatched by a dispatch unit 26. The speculative register allocation circuitry 24 maintains a register allocation table 28 to track the mapping between architectural registers, speculative registers and logical registers as will be familiar to those in this technical field.

Read suppression circuitry 30 serves to maintain a head point(er), a tail point(er) and a boundary pointer, or a plurality of boundary pointers. These pointers are used to identify positions within an allocation sequence of the speculative registers within the speculative register file 20 at which allocation and de-allocation should be made as well as to delimit a read-suppression region as will be discussed further below. When a speculative register needs to be allocated to serve as a destination register, the tail pointer is used to indicate the next speculative register to be used/allocated. The head pointer indicates the position within the allocation sequence at which the next valid register value is to be committed by being transferred into the architected register file 22 when the instruction associated with that valid register value is committed/retired such that any associated change of architectural state is confirmed.

FIG. 2 schematically illustrates the speculative register file 20 with associated pointers. These pointers are a tail pointer indicating a position at which new allocation should occur, a head pointer indicating a position at which new de-allocation should occur and a boundary pointer indicating a position delimiting one boundary of a read-suppression region in which no valid register values are found. The other limit of the read-suppression region is the tail pointer. If a read of a speculative register lies within the read-suppression region, then, since it is know that no valid register values reside within the read-suppression region, the read operation can be suppressed without being performed thereby saving energy. If a read to a speculative register lies between the boundary pointer and the head pointer, then this is within a speculative-read region. Such read operations are performed as the register value may be valid. If the register value read is marked as invalid, then the read operation will fail.

FIG. 2 also schematically illustrates an example allocation sequence. In this example the speculative registers have sequential speculative register value numbers and the allocation sequence follows this number sequence (e.g. 0 to 255) and then wraps back to the beginning in a convention manner. It will be appreciated that other allocation sequences are also possible.

FIG. 3 illustrates a further example embodiment. In this example, separate boundary pointers are maintained for integer register values and floating point register values. These are respectively an integer boundary pointer and a floating point boundary pointer. An integer read-suppression region is delimited by the tail point around the integer boundary pointer. A floating point read-suppression region is delimited by the tail pointer and then floating point boundary pointer. If a read of a speculative register is a source of an integer value and lies within the integer read-suppression region, then it is suppressed. If a read of a speculative register is a source of a floating point value, and lies within the floating point read-suppression region, then it is suppressed. As floating point operations typically take longer to perform than integer operations, it is likely that a floating point read-suppression region will be larger than the integer read-suppression region as the longer delay taken to return floating point rights will mean that the tail pointer will typically have advanced further relative to when the instructions corresponding to those writes were issued.

FIG. 4 schematically illustrates mechanisms using which the read suppression circuitry 30 may maintain an integer boundary point and a floating point boundary pointer. A particular implementation may include integer pipelines 4, 6 that have a minimum path therethrough corresponding to, for example, four clock cycles. The floating point pipeline may have a minimum path there through corresponding to, for example, nine processing cycles. As speculative registers are allocated for integer values, then the pointers for these registers are supplied to youngest selecting circuitry 32 which serves to select and generate for output a pointer value corresponding to the youngest of any of the newly inputted pointer values and a current pointer value currently being output by the youngest selecting circuitry 32. The output from the youngest selecting circuitry 32 is then latched within a first register 34. The value latched then progresses between further registers until it emerges from the final register a time later corresponding to the minimum path cycle length through the integer pipeline. At that time, the pointer value held within the file register 36 is compared within the current integer boundary pointer and if it is younger than the current value of the integer boundary pointer, then the integer boundary pointer is updated to be this new youngest boundary pointer value. The operation of the circuitry illustrated is to buffer for a number of cycles corresponding to the depth of the integer pipeline the youngest pointer to a speculative register being used at a particular cycle. After the delay imposed by the buffer illustrated, the stored value can then be used to update the boundary pointer as required. The delay within the buffer permits the tail pointer to advance ahead of the integer boundary pointer so as to establish a read-suppression region within which reads of speculative registers may be suppressed. In practice many instructions refer back to register values which were written in instructions closely preceding them. Thus, even if the read, suppression region is relatively small, it can still serve to suppress a useful portion of reads to the speculative register file 20 that have been identified as unnecessary.

FIG. 4 illustrates a similar arrangement in the case of a longer floating point pipeline. In this case, the longer the minimum path through the floating point line allows a larger potential floating point read-suppression region to be established.

FIG. 5 schematically illustrates another example mechanism by which boundary pointers may be maintained. In this mechanism both integer writes and floating point writes to the speculative register file 20 are monitored by youngest selecting circuits 32. The youngest pointer at any given cycle is identified and then supplied for comparison respectively with either the current integer boundary pointer or the current floating point boundary pointer. If the youngest newly written speculative register then the corresponding pointer value, then the corresponding pointer value is updated.

FIG. 6 is a flow diagram schematically illustrating read suppression. At step 38 processing waits until a speculative read is received. At step 48, a determination is made as to whether the sequence number of the register to be read is younger than the current value of the boundary pointer. This comparison assumes an incrementally increasing number in accordance with the allocation sequence, but it will be appreciated that different sequences can be used, for example, the allocation number could be decremented rather than incremented upon allocation.

If the determination at step 40 is that the read register has a number greater than the boundary pointer, then this corresponds to the read register lying within the read-suppression region and accordingly step 42 serves to suppress the read and the corresponding instruction is not dispatched from the dispatch unit 26. Conversely, if the determination at step 40 is that the read register has a number in the sequence that is not greater than the boundary pointer, then this corresponds to the read register lying within the speculative-read region of the speculative register file 20, and accordingly step 44 permits the read to be performed and the instruction to be dispatched to the issue queue if the read is successful (it may be that the register value read is not valid even though it lies within the speculative-read region). The read-suppression region contains speculative registers all known to be invalid. The speculative-read region corresponds to registers some of which may be invalid.

The above example assumes a "reservation station" style issue queue where register files are read at the dispatch stage on the way into the issue queues. The present techniques may also be applied to other forms of micro architecture, e.g. processors that read the register files after the instructions are issued from the issue queues, processors in which the instructions are dispatched to the issue queues and then the read data forwarded to the instructions waiting in the issue queues, or other forms of processor.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. Apparatus comprising:
   an architected register file to store committed register values within architected registers;
   a speculative register file to store uncommitted register values within speculative registers;
   speculative register allocation circuitry to allocate in order within an allocation sequence from a tail point within said allocation sequence a speculative register to serve as an operand destinations; and
   read suppression circuitry:
   (i) to maintain a boundary pointer for a type of register value to a boundary speculative register within said allocation sequence having a location within said allocation sequence such that no speculative register more recently allocated within said allocation sequence than said boundary speculative register can contain a valid register value of said type of register value; and
   (ii) to suppress a read to provide a source operand value of a speculative register within a read-suppression region of said allocation sequence delimited by said tail point and said boundary pointer.

2. Apparatus as claimed in claim 1, wherein said speculative register allocation circuitry has a configuration to deallocate in order within said allocation sequence from a head point within said allocation sequence a speculative register storing a committed register value transferred to said architected register file.

3. Apparatus as claimed in claim 1, wherein said speculative registers have sequential speculative register numbers and said allocation sequence follows said sequential speculative register numbers and wraps at limit of said sequential speculative register numbers.

4. Apparatus as claimed in claim 1, wherein said read suppression circuitry has a configuration to determine a position of said boundary pointer within said allocation sequence to correspond to a speculative register allocated at an earliest time any issued instruction can return a value.

5. Apparatus as claimed in claim 4, wherein said read suppression circuitry has a configuration to determine said earliest time based upon a quickest instruction processing pipeline present within said apparatus.

6. Apparatus as claimed in claim 4, wherein read suppression circuitry has a configuration to determine an earliest time for each of a plurality of types of register value in dependence upon a processing time of an instruction processing pipeline for each type of register value as an instruction is issued to said instruction processing pipeline.

7. Apparatus as claimed in claim 1, wherein said read suppression circuitry has a configuration to determine a position of said boundary pointer within said allocation sequence by monitoring writes to said speculative register file and updating said boundary pointer to a position corresponding to a monitored write if said monitored write is to a speculative register more recently allocated within said allocation sequence than a speculative register corresponding to a current position of said boundary pointer.

8. Apparatus as claimed in claim 1, wherein said read suppression circuitry is responsive to a flush operation that changes said tail pointer to update said boundary pointer to correspond to said tail pointer.

9. Apparatus as claimed in claim 1, wherein said read suppression circuitry has a configuration to maintain an integer boundary pointer for integer register values and a floating point boundary pointer value for floating point register values.

10. Apparatus as claimed in claim 2, said read suppression circuitry has a configuration to suppress a read of an integer source operand value within an integer read-suppression region delimited by tail pointer and said integer boundary pointer and to suppress a read of a floating point source operand value within floating point read-suppression region delimited by tail pointer and said floating point boundary pointer.

11. Apparatus as claimed in claim 1, wherein said apparatus is an out-of-order processor.

12. Apparatus as claimed in claim 11, wherein said out-of-order processor is a single threaded out-of-order processor.

13. Apparatus comprising:
   architected register file means for storing committed register values within architected registers;
   speculative register file means for storing uncommitted register values within speculative registers;
   speculative register allocation means for allocating in order within an allocation sequence from a tail point within said allocation sequence a speculative register to serve as an operand destinations; and
   read suppression means:
   (i) for maintaining a boundary pointer for a type of register value to a boundary speculative register within said allocation sequence having a location within said allocation sequence such that no speculative register more recently allocated within said allocation sequence than said boundary speculative register can contain a valid register value of said type of register value; and
   (ii) for suppressing a read to provide a source operand value of a speculative register within a read-suppression region of said allocation sequence delimited by said tail point and said boundary pointer.

14. A method comprising the steps of:
   storing committed register values within architected registers;
   storing uncommitted register values within speculative registers;
   allocating in order within an allocation sequence from a tail point within said allocation sequence a speculative register to serve as an operand destinations;
   maintaining a boundary pointer for a type of register value to a boundary speculative register within said allocation sequence having a location within said allocation sequence such that no speculative register more recently allocated within said allocation sequence than said boundary speculative register can contain a valid register value of said type of register value; and
   suppressing a read to provide a source operand value of a speculative register within a read-suppression region of said allocation sequence delimited by said tail point and said boundary pointer.

* * * * *